US008855212B2

(12) United States Patent
Najeeb (10) Patent No.: US 8,855,212 B2
(45) Date of Patent: Oct. 7, 2014

(54) SYSTEM AND METHOD FOR AV SYNCHRONIZATION OF ENCODER DATA (75) Inventor: Talha Najeeb, La Jolla, CA (US)

(73) Assignee: General Instrument Corporation, Horsham, PA (US)

(*) Notice: Subject to any disclaimer, the term of this patent is extended or adjusted under 35 U.S.C. 154(b) by 585 days.

(21) Appl. No.: 12/632,177

(22) Filed: Dec. 7, 2009

(65) Prior Publication Data
US 2011/0135010 A1 Jun. 9, 2011

(51) Int. Cl.
H04N 7/12 (2006.01)
H04N 21/2368 (2011.01)
H04N 21/242 (2011.01)

(52) U.S. Cl.
CPC ......... H04N 21/2368 (2013.01); H04N 21/242 (2013.01)
USPC .................................... 375/240.28

(58) Field of Classification Search
USPC ....................... 375/240.01, 240.28
IPC ...................................... H04N 7/12
See application file for complete search history.

(56) References Cited

U.S. PATENT DOCUMENTS 6,493,357 B1 * 12/2002 Fujisaki ................ 370/474
7,474,724 B1 * 1/2009 Gudmunson et al. ...... 375/376
2009/0310941 A1 * 12/2009 Melanson et al. .......... 386/96

* cited by examiner

Primary Examiner — Dave Czekaj
Assistant Examiner — Tracy Li
(74) Attorney, Agent, or Firm — Thomas A. Ward (57) ABSTRACT A device is provided for use with an encoder, source video data and a source video clock. The encoder can encode video data at a timebase corrected video clock and can encode audio data at a timebase corrected audio clock. The source video data includes a video data portion and an audio data portion. The device includes a video processing portion, an audio processing portion and a clock generating portion. The video processing portion is arranged to receive the source video data based on the source video clock. The audio processing portion is arranged to receive the source video data based on the source video clock. The clock generating portion can generate the timebase corrected video clock and can generate the timebase corrected audio clock. The video processing portion can provide, to the encoder, the video data portion of the source video data based on the timebase corrected video clock. The audio processing portion can provide, to the encoder, the audio data portion of the source video data based on the timebase corrected audio clock.

20 Claims, 5 Drawing Sheets

502
VIDEO LINES TO AUDIO SAMPLES DELAY CONVERSION

| VIDEO FORMAT | 1080i29 (506) | 1080i30 (508) | 720p59 (510) | 720p60 (512) |
|---|---|---|---|---|
| FRAMES / SECOND | 30 | 29.97002997 | 60 | 59.94005994 |
| LINES / FRAME | 1125 | 1125 | 750 | 750 |
| SECONDS / FRAME | 0.033333333 | 0.033366667 | 0.016666667 | 0.016683333 |
| SECONDS / LINE | 2.96296E-05 | 2.96593E-05 | 2.22222E-05 | 2.22444E-05 |
| AUDIO SAMPLES / SECOND | 48000 | 48000 | 48000 | 48000 |
| SAMPLES / LINE | 1.422222222 | 1.423644444 | 1.066666667 | 1.067733333 |
| SAMPLES / FRAME | 1600 | 1601.6 | 800 | 800.8 |
| SAMPLES / LINE APPROX. | 1.43 | 1.43 | 1.06 | 1.06 |
| SAMPLES / FRAME APPROX. | 1608.75 | 1608.75 | 795 | 795 |
| MAX ERROR (SAMPLES) | 8.75 | 7.15 | -5 | -5.8 |
| MAX ERROR (US) | 182.2916667 | 148.9583333 | -104.1666667 | -120.8333333 |

504
FPGA LOOK-UP-TABLE

| FORMAT | 1080i (514) | 720p (516) |
|---|---|---|
| CONVERSION FACTOR (n = # OF VIDEO LINES) | n x 1.44 OR n + n/2 - n/16 | n x 1.06 OR n + n/16 |

NOTES

| FRAME RATE CONVERSION FACTOR | 0.999000999 |
|---|---|
| AUDIO SAMPLING RATE | 48 kHz |

FIG. 5

SYSTEM AND METHOD FOR AV SYNCHRONIZATION OF ENCODER DATA

BACKGROUND

In many cases where a video is provided to an end user, the data of the video had been encoded into a format that is different from the original format of the data of the video. In the broadcast TV industry, "encoding" typically means "compressing", "video" refers only to visual data, and audio refers to data related to sound. Combined, visual data and audio data are referred to as audio/video data. A/V data is compressed into a first format by an encoder for transmission to an end user. Compression/encoding is typically done prior to data storage or transmission in order to reduce the amount of data that must be stored or transferred. At the end user, the compressed data is the decompressed to another format by a decoder.

The decoder must uncompress the A/V data and "present" it to a consumer such as a television (TV). For the A/V data to be displayed/heard properly, the decoder must recreate the original rates at which the data was encoded. In order to do this, the decoder relies on timing information embedded in the encoded data. For precise and glitch-free recovery by the decoder, the encoder must: (1) utilize a very stable and accurate timing reference to generate the embedded timing information; and (2) be "frequency locked" to the rate of the audio/video data being compressed. The encoder is not always able to perform these functions. The rate of the A/V data may occasionally deviate significantly from the encoder's timing embedder's requirements. Therefore, the A/V data must be transferred to a "clean" time domain prior to encoding. In other words, in many cases, the data of the video is provided at a first rate or a first clock signal, whereas the encoder is able to encode data at a second, different rate or a second clock signal. To complicate matters, the video data and audio data may additionally be provided at different clock signals and may be processed by the encoder with still different clock signals.

The process of transferring audio and video data from its source to an encoder is typically a complex process that involves synchronizing the audio and video data to respective clocks signals, while taking care to maintain audio/video (AV) synchronization between the frames in the video data and the audio signal. If there is no AV synchronization, then the audio data may be played at a time that is inconsistent with the video data that originally corresponded to the audio data. For example, when watching a video on television, if the sound does not synchronize with the image, the viewer may see a person's lips moving whereas the resulting sound (speech) does not match the lip movement. In order to maintain high performance and minimize bandwidth usage in the process of transferring audio and video data from its source to an encoder, this transfer process typically requires fairly complicated systems using costly components.

First of all, the video clock signal accompanying video data sent to an encoder is required to meet certain requirements (e.g. should be glitch-free, frequency must be within a certain range). Therefore, a clock signal synthesizer is typically used to generate a clock signal that is locked to the source video clock signal but meets these requirements. This is known as the time-base corrected (TBC) video clock signal. Using a frame buffer, the video data is then transferred from the domain of the source video clock signal to the TBC video clock signal so that it can be sent to the encoder.

Video data is typically accompanied by audio data, which may be embedded in the video data (known as ancillary audio) or may come from another source. Audio data that is not embedded in the video data, i.e., ancillary audio data, is required to be in the source audio clock domain before it can be encoded. Ancillary audio data needs to be extracted and transferred to a source audio clock domain. However, since the video data sent to the encoder is in the domain of the TBC video clock signal, the audio data must also be sent using a clock signal derived from the TBC video clock signal. Thus, it is necessary to transfer the audio data to a domain of the TBC audio clock signal. Thus, in the typical conventional process of transferring video and audio data from a source to an encoder, there are the following four clock signals: 1) the source video clock signal; 2) the source audio clock signal, consisting of an audio clock signal derived from the source video clock signal; 3) the TBC video clock signal; and 4) the TBC audio clock signal, consisting of an audio clock signal derived from TBC video clock signal.

Transferring audio data to the domain of the TBC audio clock signal, while maintaining A/V synchronization, can be a fairly complicated process, due to various considerations and limitations. One possible method is to simply re-sample the audio data in the domain of the TBC audio clock signal. However, this solution is not versatile as it is can only be implemented for uncompressed audio data, and not for pre-compressed audio data.

Another possible solution is to allow the ancillary audio data to be written to the video frame buffer along with video data, such that the audio data as well as the video data is transferred to the domain of the TBC video clock signal. However, this has the disadvantage of increasing the memory bandwidth utilization. Furthermore, this solution is also not versatile since it can only be used for embedded audio data, which has a known timing relation to the corresponding video data. Audio data from external sources is required to have a known timing relation with the video data as mentioned above. This approach is not feasible for audio data from an external source because it would complicate the frame buffer design to account for writing audio data, in addition to video data, to the frame buffer. Further, as with ancillary audio data, memory bandwidth utilization will increase.

With all these considerations, it is apparent that a versatile method for the clock signal transfer of the audio data must support both uncompressed and compressed audio data, and both embedded (ancillary) and external audio data. Furthermore, it must be able to maintain AV synchronization. The most common approach used to meet these requirements involves first transferring the audio data to a domain of the source audio clock signal, and then transferring that audio data to the encoder while providing the TBC video and audio clock signals to the encoder as a reference. The encoder must then manage the clock domain transfer of the audio data in its own buffers, while constantly exchanging frame buffer status with the frame buffer in order to maintain AV synchronization. An example of this approach will now be discussed with reference to FIG. 1.

Figure 1:
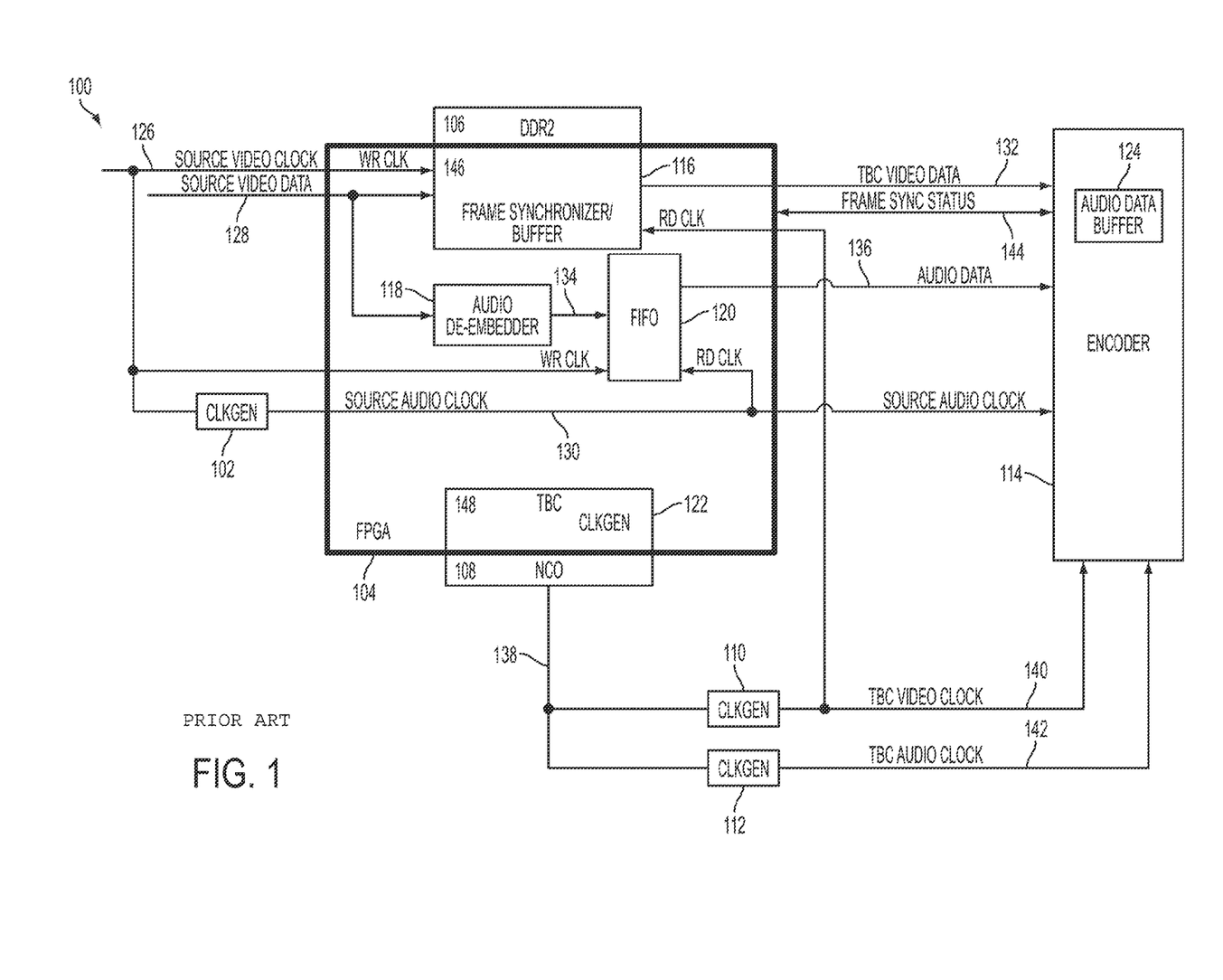
FIG. 1 is a schematic illustrating a conventional system for transferring audio data from a domain of a source clock signal to a domain of a TBC audio clock signal.

FIG. 1 is a schematic illustrating a conventional system 100 for transferring audio data from a domain of the source clock signal to a domain of the TBC audio clock signal.

Conventional system 100 includes a source clock synthesizer 102, a field programmable gate array (FPGA) 104, a double data rate synchronous dynamic random access memory (DDR2 SDRAM) 106, a numerically controlled oscillator (NCO) 108, a video clock synthesizer 110, an audio clock synthesizer 112 and an encoder 114.

FPGA 104 includes a DDR2 controller 146, an audio de-embedder 118, a first-in-first-out (FIFO) buffer 120 and an NCO controller 148. Encoder 114 includes an audio data buffer 124. DDR2 106 and DDR2 controller 146 together may be considered a frame synchronizer and buffer 116. NCO 108 and NCO controller 148 together may be considered a TBC clock synthesizer 122.

Note that in this embodiment, frame synchronizer and buffer 116 includes a portion external to FPGA 104 (DDR2 106, the "buffer" portion) as well as a portion implemented within FPGA 104 (DDR2 controller 146, the "frame synchronizer" or "controller" portion). Similarly, TBC clock synthesizer 122 includes a portion external to FPGA 104 (NCO 108) as well as a portion implemented within FPGA 104 (NCO controller 148, which may include clock signal synthesis components such as a phase comparator and loop filter).

Source clock synthesizer 102 is arranged to receive source video clock signal 126 and to output a source audio clock signal 130. Audio de-embedder 118 is arranged to receive source video data 128 and to output audio data 134. FIFO buffer 120 is arranged to receive audio data 134, source video clock signal 126 and source audio clock signal 130 and to output audio data 136. TBC clock synthesizer 122 is arranged to provide reference clock signal 138. Video clock synthesizer 110 is arranged to receive reference clock signal 138 and to output TBC video clock signal 140. Audio clock synthesizer 112 is arranged to receive reference clock signal 138 and to output TBC audio clock signal 142. Frame synchronizer and buffer 116 is arranged to receive source video clock signal 126, source video data 128 and TBC video clock signal 140 and to output TBC video data 132 and frame sync status 144. Encoder 114 is arranged to receive TBC video data 132, frame sync status 144, audio data 136, source audio clock signal 130, TBC video clock signal 140 and TBC audio clock signal 142 and to output frame sync status 144. Audio data buffer 124 is arranged to receive audio data 136.

Source video data 128 includes portions of video data and portions of audio data. Source video data 128 is provided by source video clock signal 126. In order for encoder 114 to be able to encode source video data 128 for transmission, source video data 128 must be provided to encoder 114 at a TBC clock signal speed. In many cases, source video clock signal 126 is not a TBC clock signal speed. Accordingly, frame synchronizer and buffer 116 is operable to synchronize and buffer frames of the video data of source video data 128. In other words, video data of source video data 128 is written into frame synchronizer and buffer 116 using source video clock signal 126. The video data of source video data 128 will then be read from frame synchronizer and buffer 116 as TBC video data 132 using TBC clock signal 140.

Audio de-embedder 118 is operable to strip out the portions of audio data from source video data 128 and provide those portions to FIFO buffer 120 as audio data 134. Audio data 134 is written into FIFO buffer 120 with source video clock signal 126. Audio data 136 is read from FIFO buffer 120 with source audio clock signal 130.

As discussed above, video and audio data are written into their respective buffers with the same write clock signal, but are read from their respective buffers with different clock signals. This is a source of problems with the conventional system.

In particular, audio data 136 is read from FIFO buffer 120 using source audio clock signal 130, which is based on source video clock signal 126. If there is a problem with source video clock signal 126, then there will be a problem with source audio clock signal 130. In such a case, there will be a problem reading audio data 136 from FIFO buffer 120, but TBC video data 132 will still be read from frame synchronizer and buffer 116 with TBC video clock signal 140. In this situation, encoder 114 will recognize, by way of frame sync status 144, that audio data 136 does not synchronize with TBC video data 132 and will adjust the amount of audio data buffered in audio data buffer 124 to compensate.

In many cases A/V data has different amounts of video data than audio data (in most cases there is much more video data than audio data). To account for the disparity in the types of data, encoder 114 will encode the video data and the audio data at different rates, which are phase-locked. Video clock synthesizer 110 generates TBC video clock signal 140 from reference clock signal 138. Similarly, audio clock synthesizer 112 generates TBC audio clock signal 142 from reference clock signal 138. Video clock synthesizer 110 and audio clock synthesizer 112 are set such that TBC video clock signal 140 and TBC audio clock signal 142 meet the requirements of encoder 114 for encoding AV data in accordance with the predetermined coding scheme.

TBC video data 132 is written into encoder 114 by way of TBC video clock signal 140. Audio data 136 is written into audio data buffer 124 by way of source audio clock signal 130. Audio data 136 is read from audio data buffer 124 by way of TBC audio clock signal 142.

Video clock synthesizer 110 generates TBC video clock signal 140 and audio clock synthesizer 112 generates TBC audio clock signal 142 based on reference clock signal 138. Therefore TBC video clock signal 140 and TBC audio clock signal 142 are of the same domain. Encoder 114 uses TBC video clock signal 140 to write TBC video data 132 for encoding. Encoder 114 uses TBC audio clock signal 142 to write audio data from audio data buffer 124 for encoding.

Figure 2:
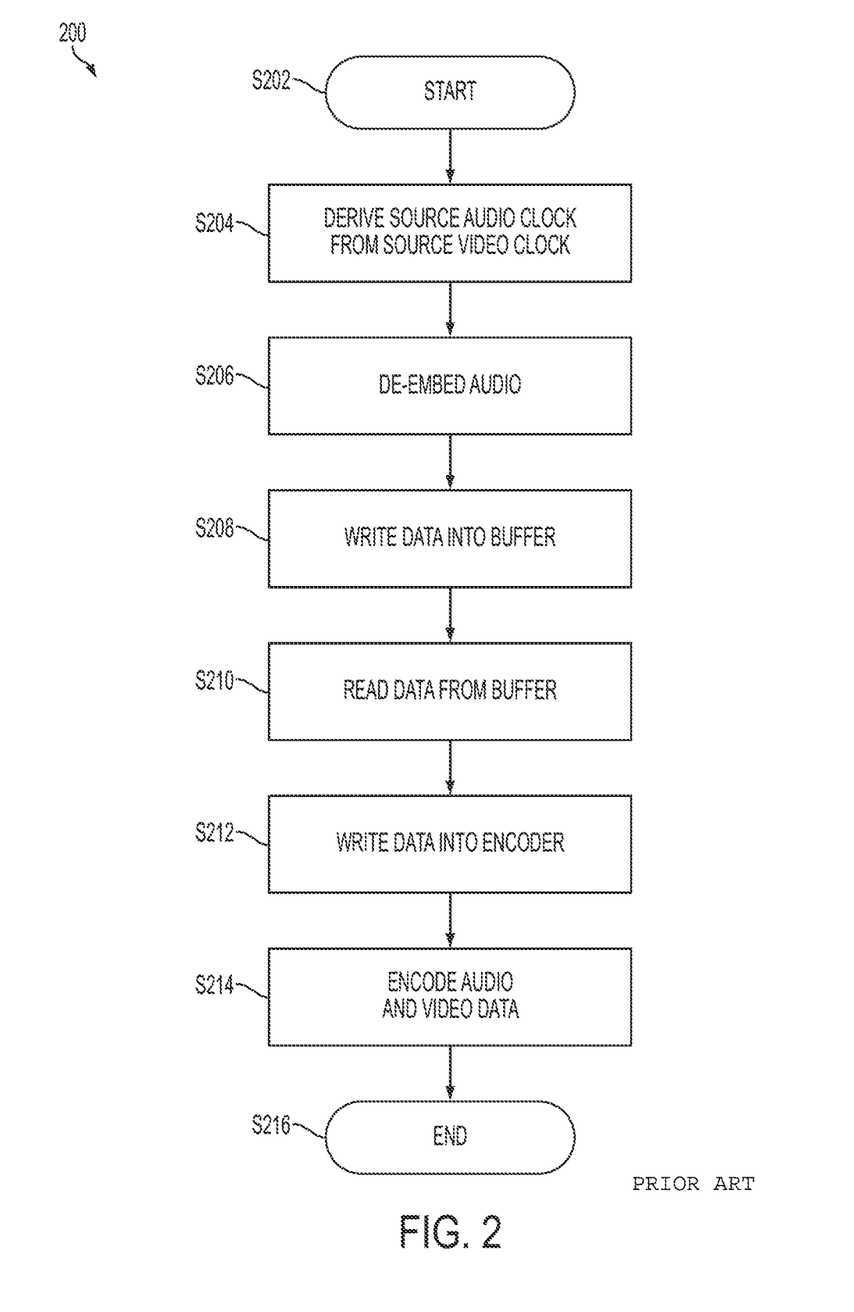
FIG. 2 illustrates an example method for the operation of the conventional system of FIG. 1.

An example method 200 for the operation of conventional system 100 will now be described with reference to FIG. 2.

In operation, process 200 starts (S202) and source video clock synthesizer 102 receives source video clock signal 126 and produces source audio clock signal 130 (S204).

Source video data 128 for encoding is additionally supplied to the video and audio buffers (S206). Audio de-embedder 118 receives source video data 128, which includes video data portions and audio data portions, and extracts the audio data portions as audio data 134. Audio de-embedder 118 then provides audio data 134 to FIFO buffer 120. Source video data 128 is concurrently provided to frame synchronizer and buffer 116.

At this point, source video data 128 is then written to the video and audio buffers (S208). Source video clock signal 126 enables source video data 128 to be written into frame synchronizer and buffer 116 and additionally enables audio data 134 to be written into FIFO buffer 120.

Audio data is then supplied to the encoder (S210). Audio data 136 is read from FIFO buffer 120 using source audio clock signal 130. Audio data 136 is then provided to audio data buffer 124 within encoder 114.

TBC video data 132 is then supplied to encoder 114 (S212). TBC video data 132 is read from frame synchronizer and buffer 116 using TBC video clock signal 140. TBC video data 132 is then provided to encoder 114.

At this point, TBC video clock signal 140 writes TBC video data 132 into encoder 114 while TBC audio clock signal 142 writes audio data 136 from audio data buffer 124 into encoder 114 (S212). Audio data buffer 124 may full up if too much audio data is provided for a corresponding portion of video data. This may occur when data is read from frame synchronizer and buffer 116 at a rate that is slower than the required rate for the data that is read from FIFO buffer 120. In other words, if source audio clock 130 is not synchronized with TBC video clock 140, audio 136 may be read into audio data buffer 124 at a much higher rate than TBC video data 132 is read into Encoder 114. This situation may cause audio data buffer 124 to fill up. To account for this situation, during step S212, encoder 114 constantly exchanges frame buffer status (via frame sync status 144) with frame synchronizer and buffer 116, in order to maintain AV synchronization.

Encoder 114 then encodes TBC video data 132 and audio data 136 (S214) in accordance with a predetermined coding scheme and process 200 stops (S216).

The problem with conventional system 100 (and corresponding process 200) is that it typically requires costly components, and also involves fairly complicated design and debugging efforts. Specifically, source audio clock synthesizer 102, which is required to generate source audio clock signal 130 from source video clock signal 126 (S204), might not accurately lock with source video clock signal 126. This may case large swings, or even overflow, in data storage within FIFO buffer 120. Further, reading audio data 136 into audio data buffer 124 with source audio clock signal 130 might not accurately correspond the reading of TBC video data 132 into encoder 114 with TBC video clock signal 140. This may case large swings, or even overflow, in audio data buffer 124. Overflow in data storage within FIFO buffer 120 or within audio data buffer 124 may disrupt AV synchronization. To avoid this issue in the conventional method, a very significant amount of design, integration and debugging of resources may be required.

What is needed is a system and method that can perform the process of transferring audio data from a domain of the source clock signal to a domain of the TBC audio clock signal while preserving A/V synchronization in a simple, cost-effective manner, thereby providing significant cost and design time reduction benefits.

BRIEF SUMMARY

The present invention provides a system and method that can perform the process of transferring audio data from a domain of the source clock signal to a domain of the TBC audio clock signal while preserving A/V synchronization in a simple, cost-effective manner, thereby providing significant cost and design time reduction benefits.

In accordance with an aspect of the present invention, a device is provided for use with an encoder, source video data and a source video clock. The encoder can encode video data at a timebase corrected video clock and can encode audio data at a timebase corrected audio clock. The source video data includes a video data portion and an audio data portion. The device includes a video processing portion, an audio processing portion and a clock generating portion. The video processing portion is arranged to receive the source video data based on the source video clock. The audio processing portion is arranged to receive the source video data based on the source video clock. The clock generating portion can generate the timebase corrected video clock and can generate the timebase corrected audio clock. The video processing portion can provide, to the encoder, the video data portion of the source video data based on the timebase corrected video clock. The audio processing portion can provide, to the encoder, the audio data portion of the source video data based on the timebase corrected audio clock.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with an aspect of the present invention, a system and method is able to perform the process of transferring audio data from a domain of a source clock signal to a domain of a TBC audio clock signal in a simple and cost-effective manner.

An example embodiment in accordance with an aspect of the present invention will now be described in reference to FIG. 3.

Figure 3:
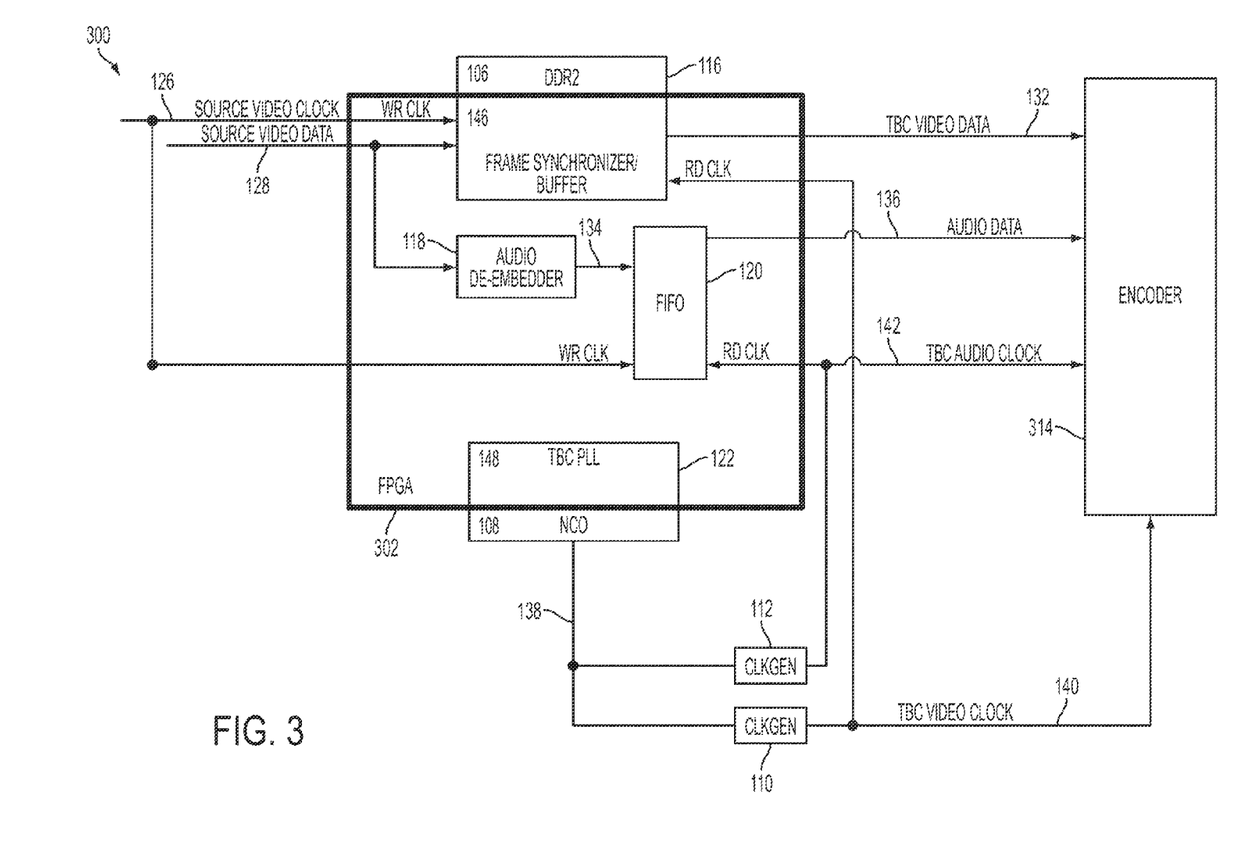
FIG. 3 illustrates a system for transferring audio data from a domain of a source clock signal to a domain of a TBC audio clock signal, in accordance with an aspect of the present invention.

FIG. 3 illustrates a system 300 for transferring audio data from a domain of a source clock signal to a domain of a TBC audio clock signal, in accordance with an aspect of the present invention.

System 300 includes a field programmable gate array (FPGA) 302, double data rate synchronous dynamic random access memory (DDR2 SDRAM) 106, numerically controlled oscillator (NCO) 108, video clock synthesizer 110, audio clock synthesizer 112 and an encoder 314.

FPGA 302 includes DDR2 controller 146, audio de-embedder 118, FIFO buffer 120 and NCO controller 148. DDR2 106 and DDR2 controller 146 together may be considered frame synchronizer and buffer 116. NCO 108 and NCO controller 148 together may be considered TBC clock synthesizer 122.

Similar to conventional system 100 discussed above, audio de-embedder 118 is arranged to receive source video data 128 and to output audio data 134. TBC clock synthesizer 122 is arranged to provide TBC reference clock signal 138. Video clock synthesizer 110 is arranged to receive TBC reference clock signal 138 and to output TBC video clock signal 140. Audio clock synthesizer 112 is arranged to receive TBC reference clock signal 138 and to output TBC audio clock signal 142. FIFO buffer 120 is arranged to receive audio data 134 and source video clock signal 126 and to output TBC audio data 136. Frame synchronizer and buffer 116 is arranged to receive source video clock signal 126, source video data 128 and TBC video clock signal 140 and output TBC video data 132. Encoder 314 is arranged to receive TBC video data 132, TBC audio data 136, TBC video clock signal 140 and TBC audio clock signal 142.

Audio de-embedder 118 is operable to strip out the portions of audio data from source video data 128 and provide portions to FIFO buffer 120 as audio data 134. Audio data 134 is written into FIFO buffer 120 with source video clock signal 126. Unlike conventional system 100 discussed above with reference to FIG. 1, in system 300, audio data 136 is read from buffer 120 with TBC Audio Clock 142.

Further, unlike system 100, system 300 does not contain a clock synthesizer to derive a source audio clock signal from source video clock signal 126 (such as source audio clock synthesizer 102 in conventional system 100). Rather, TBC audio clock signal 142 is instead supplied to FIFO buffer 120 as the read clock signal such that resulting output (TBC audio data 136) is in the domain of TBC audio clock signal 142. Further, encoder 314 does not contain an audio buffer (such as audio buffer 124 in conventional system 100), nor does encoder 314 exchange frame sync status with frame synchronizer and buffer 116.

Therefore, in accordance with an aspect of the present invention, TBC video clock signal 140 and TBC audio clock signal 142 are generated from a single source, TBC reference clock signal 138. Accordingly TBC video data 132 will always be read from frame synchronizer and buffer 116 with in a manner corresponding to audio data 136 being read from FIFO buffer 120.

Figure 4:
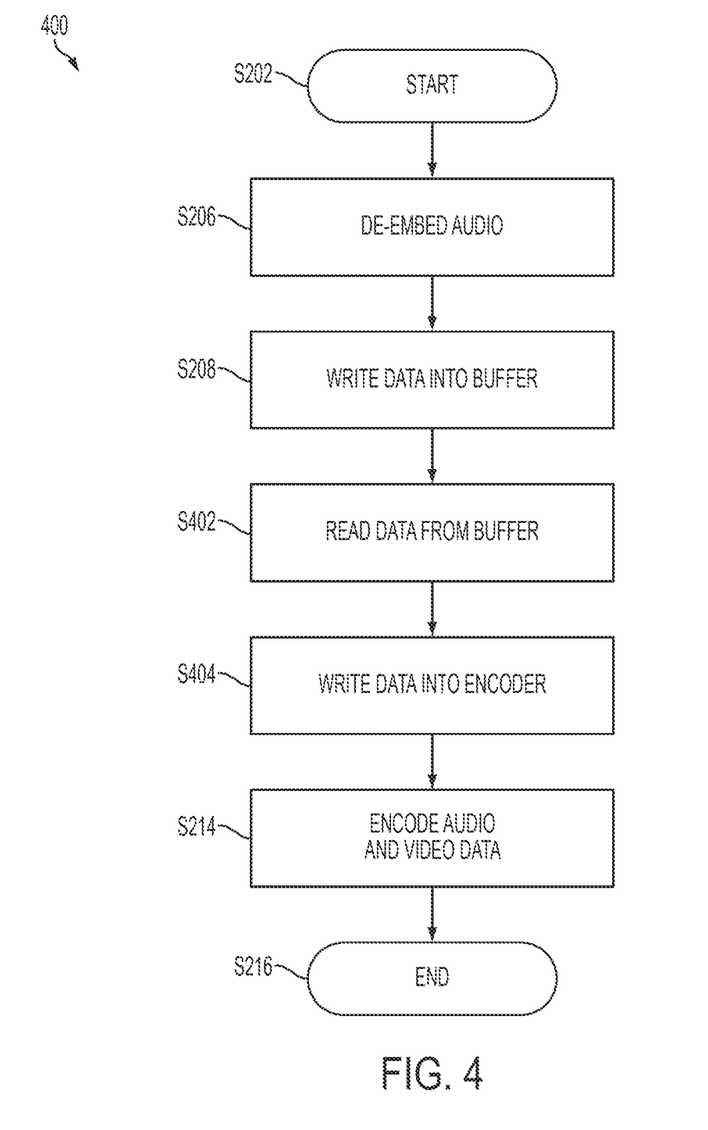
FIG. 4 illustrates an example method for the operation of the system of FIG. 3, in accordance with an aspect of the present invention.

An example method 400 for the operation of system 300 in accordance with an aspect of the present invention will now be described with reference to FIG. 4.

In operation, process 400 starts (S202).

Source video data 128 for encoding is supplied to the video and audio buffers. Audio de-embedder 118 receives source video data 128, which includes video data portions and audio data portions, and extracts the audio data portions as audio data 134 (S206). Audio de-embedder 118 then provides audio data 134 to FIFO buffer 120. Source video data 128 is concurrently provided to frame synchronizer and buffer 116.

At this point, source video data 128 is then written to the video and audio buffers (S208). Source video clock signal 126 enables source video data 128 to be written into frame synchronizer and buffer 116 and additionally enables audio data 134 to be written into FIFO buffer 120.

TBC video data 132 and audio data 136 are then supplied to encoder 314 (S402). TBC video data 132 is read from frame synchronizer and buffer 116 using TBC video clock signal 140. TBC video data 132 is then provided to encoder 314. Audio data 136 is read from FIFO buffer 120 using TBC audio clock signal 142. Audio data 136 is then provided to encoder 314.

At this point, TBC video clock signal 140 writes TBC video data 132 into encoder 314 while TBC audio clock signal 142 writes audio data 136 into encoder 314 (S404).

Encoder 314 then encodes TBC video data 132 and audio data 136 (S214) in accordance with a predetermined coding scheme and process 200 stops (S216).

Method 400 differs from method 200 discussed above in that, process 400 does not derive a source audio clock signal from the source video clock signal and does not buffer audio data and then transfer the audio data to the domain of the TBC audio clock signal. This is because in step S402, audio data 134 is transferred from the domain of source video clock signal 126 to that of TBC audio clock signal 142, avoiding the generation of a source audio clock signal and also the need for encoder 314 to buffer audio data 136 to complete its clock domain transfer.

In an example embodiment, TBC reference clock signal 138 output from TBC clock synthesizer 122 is a 27 MHz signal. As shown in system 300 of FIG. 3, TBC reference clock signal 138 is supplied to two devices; TBC video clock synthesizer 110 and TBC audio clock synthesizer 112. TBC video clock synthesizer 110 is used to generate the required video frequency (TBC video clock signal 140), which may include frequencies such as 27 MHz, 74.25 MHz, or 74.25*1000/1001 MHz, depending on the video format. TBC audio clock synthesizer 112 is used to generate the required audio frequency (TBC audio clock signal 142), which may be a multiple of 32 kHz, 44.1 kHz, or 48 kHz, depending on the audio sampling rate. It should be noted that the generation of an audio frequency from a 27 MHz clock signal (TBC reference clock signal 138) can be easily achieved with readily available and inexpensive parts. In contrast, the generation of an audio frequency using an HD video clock signal (as done in conventional system 100, in S204 of process 200) requires costly and hard-to-obtain devices. Source audio clock synthesizer 102 is typically a very expensive and difficult-to-find clock synthesis device.

As mentioned previously, frame synchronizer and buffer 116 is used to transfer source video data 128 from the domain of source video clock signal 126 to the domain of TBC video clock signal 140 (S410 of process 400). A "depth" of a frame buffer is considered the register size of the frame buffer, wherein each register is operable to store image data corresponding to a single frame. For example, a frame buffer having a depth of one (1) may store image data corresponding to a single frame, whereas a frame buffer having a depth of five (5) may store image data corresponding to five frames. In an example embodiment, the minimum depth of the video frame buffer in frame synchronizer and buffer 116 is 2 video frames, and during operation, the level may vary by anywhere between 1 and 2 frames. As long as source video clock signal 126 and TBC video clock signal 140 are locked, this depth remains constant. If lock between TBC video clock 140 and TBC audio clock 142 is lost momentarily or periodically, this causes the video frame buffer to either drain or accumulate. But since FPGA 104 controls NCO 108, which is involved in the generation of TBC video clock signal 140, FPGA 104 can "speed up" or "slow down" TBC reference clock signal 138 (and thereby "speed up" or "slow down" TBC video clock signal 140) in order to counter the effect of the drift of the source video clock signal 126. Thus, every time the depth of the video frame buffer deviates beyond some threshold from its initial depth, TBC video clock signal 140 can be adjusted until the depth returns to the initial value.

Note that in the example embodiment discussed above with reference to FIG. 3, only a single audio channel design is presented and discussed. The single channel design however, can be replicated to support additional audio channels. Also, note that in FIG. 3, embedded audio data is extracted from source video data 128 and written to FIFO buffer 120 in the domain of source video clock signal 126. For the case of external audio data, the audio data is written to FIFO buffer 120 in the domain of source audio clock signal 130. In both cases of embedded and external audio data, the audio data is read from FIFO buffer 120 in the domain of TBC audio clock signal 142. In this manner, audio data is transferred from either the domain of source video clock signal 126 (in the case of embedded audio) or the domain of source audio clock signal 130 (external audio) to the domain of TBC audio clock signal 142.

For this clock domain transfer of audio data, as long as the "write" clock signal (source video clock signal 126, in the case of embedded audio) and the "read" clock signal (TBC audio clock signal 142) of FIFO buffer 120 are locked, there will be no problems. However, if TBC clock synthesizer 122 is unable to lock or loses lock momentarily or periodically, FIFO buffer 120 may underflow or overflow.

Increasing the depth of FIFO buffer 120 can help make the overflows/underflows less frequent, but will not eliminate them. Further, as mentioned earlier, increasing the depth of FIFO buffer 120 may introduce AV synchronization delays. Thus, in accordance with an aspect of the present invention, in system 300 this problem is solved by reproducing the behavior of frame synchronization and buffer 116 in FIFO buffer 120 when the source video clock signal 126 and TBC video clock signal 140 are not locked. This can be accomplished by creating FIFO buffer 120 deep enough to hold at least one video frame worth of audio data and then initializing FIFO buffer 120 to the same depth as the video frame buffer in frame synchronization and buffer 116. In this manner, since FIFO buffer 120 is being read with an audio clock signal that is derived from TBC reference clock signal 138, any manipulation of TBC reference clock signal 138 to maintain the level of the video frame buffer (as discussed previously) will be reflected in FIFO buffer 120 as well, and therefore FIFO buffer 120 will track the video frame buffer's depth at all times. Thus, as long as video frame buffer level does not empty or fill up, FIFO buffer 120 will not overflow or underflow. An example implementation of this aspect of the present invention will now be discussed in further detail with reference to FIG. 5.

Figure 5:
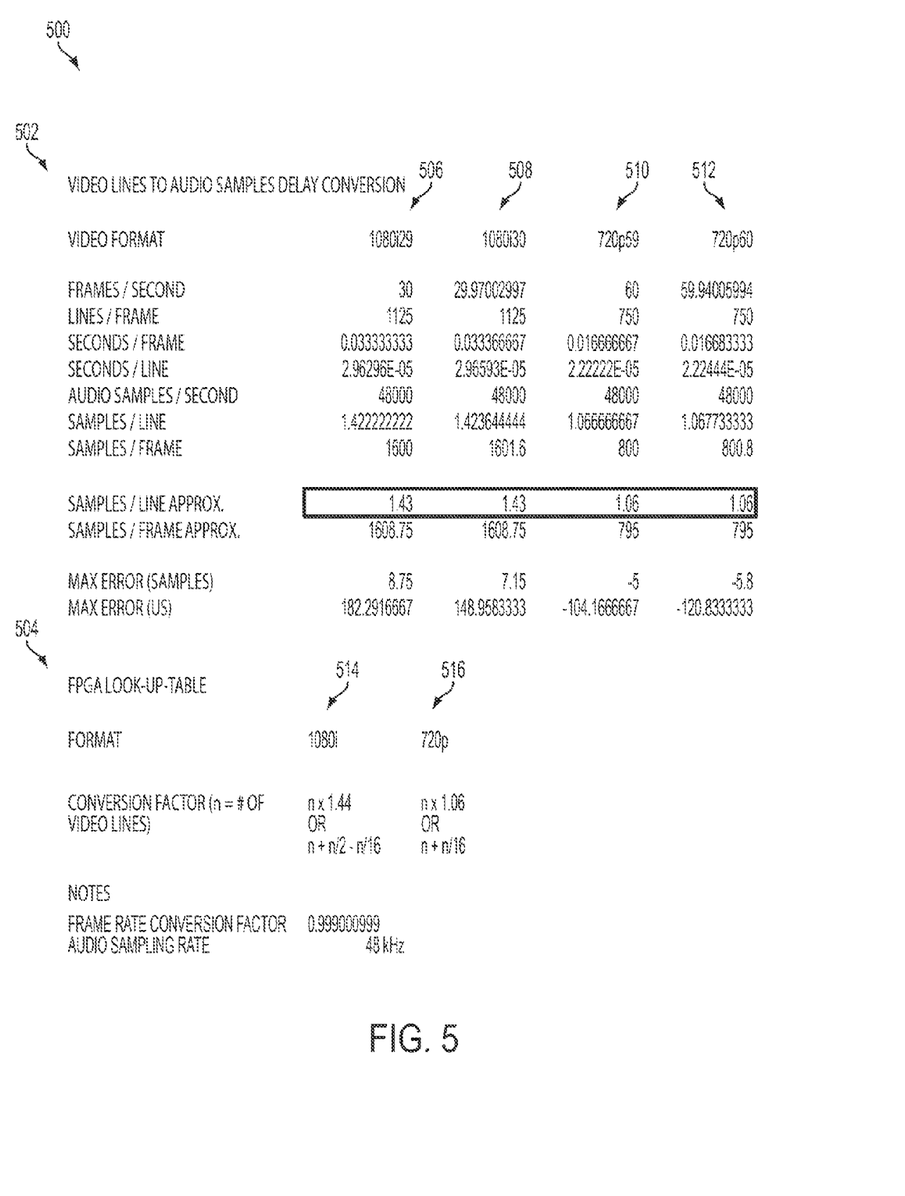
FIG. 5 illustrates an example set of calculation and conversion tables used in the system of FIG. 3, in accordance with an aspect of the present invention.

FIG. 5 illustrates an example set of calculation and conversion tables 500 used in system 300, in accordance with an aspect of the present invention. Table set 500 includes table 502 and table 504. Table 502 includes columns 506, 508, 510 and 512, whereas table 504 includes columns 514 and 516. Table 502 illustrates calculations of audio samples per video lines for a variety of video formats. Table 504 illustrates a lookup table that may be maintained in FPGA 302, which provides the formula for the number of audio samples, given the number of audio lines for a variety of video formats.

The usage of tables 502 and 504 will be illustrated in the following example. For purposes of discussion, presume the format of source video data 128 is 1080i at 29.97 frames per second (fps), which corresponds to column 508 in table 502. FPGA 302 detects source video data 128 is good and begins writing video data to frame synchronizer and buffer 116. After one complete video frame has been written, the frame synchronizing portion of frame synchronizer and buffer 116 starts waiting for a start-of-frame signal from the frame template generator to start reading from the video frame buffer portion. Suppose that this occurs 300 video lines after the first frame was written. Thus, FIFO buffer 120 must be initialized with an equivalent amount of audio data. For audio data at 48 kHz, there are 48,000 audio samples per second. Further, 1080i at 29.97 fps with 1125 lines per frame has approximately 1125*29.97=33,716 lines per second (or 2.96593E-05 seconds per line). As shown in column 508, this translates to 48,000/33,716=1.4236 audio samples per video line, or approximately 1.43 samples per line.

Table 504 is then used within FPGA 302 to obtain the conversion factor, or the number of audio samples per video line. In the above example, the video format is 1080i, so column 514 is used. The conversion formula in this case for the number of audio samples required would be 1.44n (where n is the number of video lines required), which may be implemented as n+n/2−n/16 inside FPGA 302. FPGA 302 may start writing data to FIFO buffer 120 and when the depth required by the above formula is achieved (300 lines×1.44 samples/per line=432 samples), it will start reading from FIFO buffer 120. In this manner, the depth of FIFO buffer 120 will initially be equivalent to that of the video frame buffer inside frame synchronizer and buffer 116 and FIFO buffer 120 will track the frame buffer's behavior from that point on.

In summary, in accordance with an aspect of the present invention, a FIFO buffer is implemented inside an FPGA that tracks the behavior of the video frame buffer, thereby allowing a glitch-free transfer of audio data from the domain of the source clock signal to a domain of the TBC clock signal, thus eliminating the need for costly clock synthesis devices that would otherwise be required for such a transfer. Furthermore, exact AV synchronization is guaranteed within the FPGA, without the need for a more complicated design involving multiple devices, such as the encoder. This approach can be implemented for all types of audio data, whether pre-compressed or uncompressed and embedded in video data or from an external source.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for use with an encoder, source video data and a source video clock, the encoder being operable to encode video data at a timebase corrected video clock and to encode audio data at a timebase corrected audio clock, the source video data including a video data portion and an audio data portion, said device comprising:

a video processing portion arranged to receive the source video data based on the source video clock;

an audio processing portion arranged to receive the source video data based on the source video clock; and a single clock generating portion operable to generate the timebase corrected video clock and to generate the timebase corrected audio clock, wherein said video processing portion is operable to provide, to the encoder, the video data portion of the source video data based on the timebase corrected video clock, wherein said audio processing portion is operable to provide, to the encoder, the audio data portion of the source video data based on the timebase corrected audio clock, and wherein the timebase corrected audio clock is a sole clock used to provide the audio data portion for encoding.

2. The device of claim 1, wherein said audio processing portion includes an audio de-embedder, and wherein said audio de-embedder is arranged to receive the source video data and to output the audio data portion.

3. The device of claim 2, wherein said audio processing portion further includes a buffer, and wherein said buffer is arranged to receive the audio data portion based on the source video clock.

4. The device of claim 3, wherein said single clock generating portion includes a timebase corrected synthesizer operable to generate a reference signal.

5. The device of claim 4,
wherein said single clock generating portion further includes a video clock synthesizer and an audio clock synthesizer,
wherein said video clock synthesizer is operable to generate the timebase corrected video clock based on the reference signal, and
wherein said audio clock synthesizer is operable to generate the timebase corrected audio clock based on the reference signal.

6. The device of claim 2, wherein said single clock generating portion includes a timebase corrected synthesizer operable to generate a reference signal.

7. The device of claim 6,
wherein said single clock generating portion further includes a video clock synthesizer and an audio clock synthesizer,
wherein said video clock synthesizer is operable to generate the timebase corrected video clock based on the reference signal, and
wherein said audio clock synthesizer is operable to generate the timebase corrected audio clock based on the reference signal.

8. The device of claim 1, wherein said single clock generating portion includes a timebase corrected synthesizer operable to generate a reference signal.

9. The device of claim 8,
wherein said single clock generating portion further includes a video clock synthesizer and an audio clock synthesizer,
wherein said video clock synthesizer is operable to generate the timebase corrected video clock based on the reference signal, and
wherein said audio clock synthesizer is operable to generate the timebase corrected audio clock based on the reference signal.

10. A method of providing source video data to an encoder with a source video clock, the encoder being operable to encode video data at a timebase corrected video clock and to encode audio data at a timebase corrected audio clock, the source video data including a video data portion and an audio data portion, said method comprising:
receiving the source video data based on the source video clock;
generating the timebase corrected video clock;
generating the timebase corrected audio clock, wherein the timebase corrected video clock and the timebase corrected audio clock are generated from a single clock source;
providing, to the encoder, the video data portion of the source video data based on the timebase corrected video clock; and
providing, to the encoder, the audio data portion of the source video data based on the timebase corrected audio clock, wherein the timebase corrected audio clock is a sole clock used to provide the audio data portion for encoding.

11. The method of claim 10, wherein said receiving the source video data based on the source video clock comprises receiving, by way of an audio de-embedder, the source video data and outputting the audio data portion.

12. The method of claim 11, said receiving the source video data based on the source video clock further comprises receiving, by way of a buffer, the audio data portion based on the source video clock.

13. The method of claim 12, wherein said generating the timebase corrected video clock comprises generating the timebase corrected video clock based on a reference signal.

14. The method of claim 13, wherein said generating the timebase corrected audio clock comprises generating the timebase corrected audio clock based on the reference signal.

15. The method of claim 12, wherein said generating the timebase corrected audio clock comprises generating the timebase corrected audio clock based on the reference signal.

16. The method of claim 11, wherein said generating the timebase corrected video clock comprises generating the timebase corrected video clock based on a reference signal.

17. The method of claim 16, wherein said generating the timebase corrected audio clock comprises generating the timebase corrected audio clock based on the reference signal.

18. The method of claim 11, wherein said generating the timebase corrected audio clock comprises generating the timebase corrected audio clock based on the reference signal.

19. The method of claim 10, wherein said generating the timebase corrected video clock comprises generating the timebase corrected video clock based on a reference signal.

20. The method of claim 19, wherein said generating the timebase corrected audio clock comprises generating the timebase corrected audio clock based on the reference signal.

* * * * *